(12) United States Patent
Chenard et al.

(10) Patent No.: US 11,506,818 B1
(45) Date of Patent: Nov. 22, 2022

(54) CIRCULAR PHOTONIC CRYSTAL FIBERS

(71) Applicant: IRflex Corporation, Danville, VA (US)

(72) Inventors: Francois Chenard, Danville, VA (US); Oseas D. Alvarez, Danville, VA (US)

(73) Assignee: IRflex Corporation, Danville, VA (US)

( * ) Notice: Subject to any disclaimer, the term of this patent is extended or adjusted under 35 U.S.C. 154(b) by 0 days.

(21) Appl. No.: 17/558,641

(22) Filed: Dec. 22, 2021

(51) Int. Cl.
*G02B 6/02* (2006.01)
*G02B 1/00* (2006.01)

(52) U.S. Cl.
CPC ......... *G02B 1/005* (2013.01); *G02B 6/02309* (2013.01); *G02B 6/02323* (2013.01); *G02B 6/02361* (2013.01)

(58) Field of Classification Search
CPC ............ G02B 6/02309; G02B 6/02323; G02B 6/02361; G02B 1/005
See application file for complete search history.

(56) References Cited

U.S. PATENT DOCUMENTS

| | | | |
|---|---|---|---|
| 7,046,887 B2 | 5/2006 | Kawanishi | |
| 7,792,161 B2* | 9/2010 | Hongo | G02B 6/02328 385/125 |
| 9,645,309 B2* | 5/2017 | Dong | G02B 6/02338 |
| 10,261,245 B2 | 4/2019 | Sulejmani | |
| 2001/0026667 A1 | 10/2001 | Kawanishi | |
| 2014/0245794 A1 | 9/2014 | Nguyen | |

FOREIGN PATENT DOCUMENTS

| | | |
|---|---|---|
| CN | 102778723 | 12/2013 |
| CN | 103197371 | 12/2014 |
| CN | 105116486 | 12/2015 |
| CN | 107843953 | 3/2018 |
| CN | 113740956 | 12/2021 |
| EP | 1441244 | 11/2006 |

OTHER PUBLICATIONS

Birks, "Endlessly single-mode photonic crystal fiber", Jul. 1, 1997, 3 pages, Optics Letters vol. 22, No. 13.
Ebendorff-Heidepriem, "Extrusion of complex preforms for microstructured optical fibers", Nov. 12, 2007, 7 pages, Optics Express, vol. 15, No. 23.
Gunasundari, "Silicon Nanowire Embedded Circular Photonic Crystal Fiber for Nonlinear Applications", Jul. 24, 2013, 4 pages, ResearchGate. Proceedings of the "International Conference on Advanced Nanomaterials & Emerging Engineering Technologies" (ICANMEET-20J3).

(Continued)

*Primary Examiner* — Sung H Pak
(74) *Attorney, Agent, or Firm* — Michael Haynes PLC; Michael N. Haynes

(57) ABSTRACT

Certain exemplary embodiments can provide a system, machine, device, and/or manufacture adapted for and/or resulting from, and/or a method for, activities that can include and/or relate to, providing a photonic crystal fiber that includes an elongated solid core that extends a length of the photonic crystal fiber and defines a fiber longitudinal axis and an elongated annular cladding extending the length of the photonic crystal fiber and is co-axial with the core.

25 Claims, 6 Drawing Sheets

(56) References Cited

OTHER PUBLICATIONS

Hansen, "Highly Birefringent Index-Guiding Photonic Crystal Fibers", Jun. 6, 2001, 3 pages, IEEE Photonics Technology Letters, vol. 13, No. 6.
Islam, "Equiangular spiral photonic crystal fibers with low bending loss", Oct. 1, 2013, 4 pages, Optical Engineering, vol. 52(10) Oct. 2013.
Kanungo, "Birefringence and large mode area analysis of segmented cladding indexguiding photonic crystal fibers", Feb. 1, 2015, 8 pages, Optical Engineering 54(2).
Knight, "All-silica single-mode optical fiber with photonic crystal cladding", Oct. 1, 1996, 3 pages, Optics Letters, vol. 21, No. 19.
Maji, "Circular Photonic Crystal Fibers: Numerical Analysis of Chromatic Dispersion and Losses", Aug. 8, 2013, 9 pages, Hindawi Publishing Corporation ISRN Optics vol. 2013, Article ID 986924.
Ortigosa-Blanch, "Highly birefringent photonic crystal fibers", Sep. 15, 2000, 3 pages, Optics Letters, vol. 25, No. 18.
Suzuki, "Optical properties of a low-loss polarization-maintaining photonic crystal fiber", Dec. 17, 2001, 5 pages, Optics Express, vol. 9, No. 13.

\* cited by examiner

CIRCULAR PHOTONIC CRYSTAL FIBERS

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary figures in which.

DESCRIPTION

Figure 1:
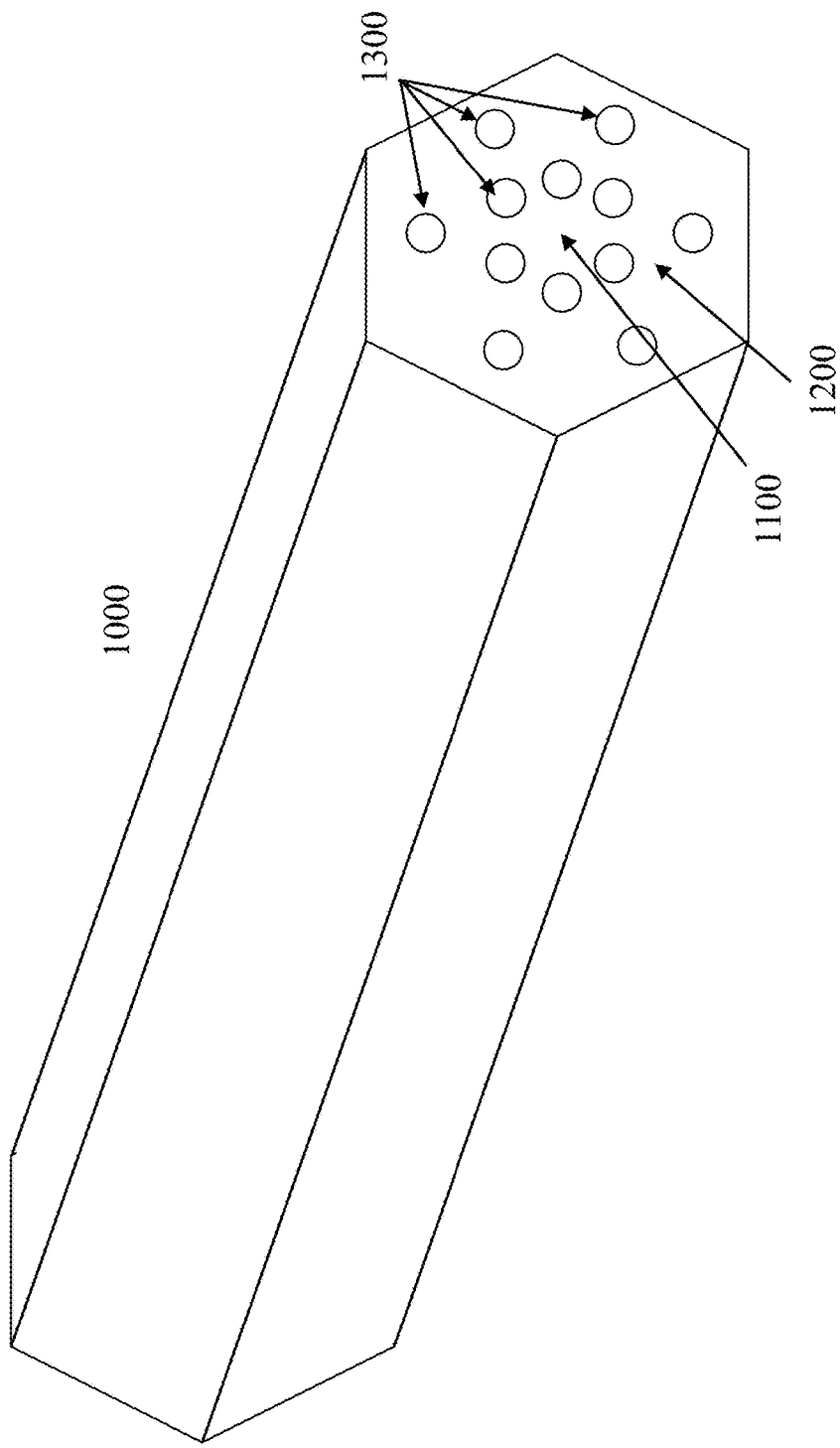
FIG. 1 is a cross-sectional view of a PCF with solid core surrounded by a microstructure cladding.

As shown in FIG. 1, certain exemplary embodiments can provide an elongated circular photonic crystal fiber (PCF) 1000, which can be made from an extruded preform made of soft glass, the PCF defined by a longitudinally-extended solid core 1100 surrounded by a two-dimension array 1200 of longitudinal air holes 1300 running along the full length of the fiber and providing confinement and/or guidance for the light. Such a PCF can be made by stacking an array of longitudinally-extending silica capillaries and/or tubes, some having different cross-sectional characteristic dimensions, in a predetermined arrangement and replacing the central capillary with a solid silica rod to make the solid core, and then fusing the array to form a substantially monolithic PCF. Certain exemplary embodiments can provide PCFs that guide light only in the fundamental mode regardless of the wavelength. Such PCFs are referred to herein as endlessly single mode (ESM) fiber. The guidance mechanism and design of this circular PCF 1000 can allow the low-loss transmission of high-power laser with large mode field area and good beam quality over a broad transmission band.

One or more exemplary PCFs can guide light in the core region by either total internal reflection where the cladding refractive index is an average index of the glass and the holey area air filling fraction or can confine the light via the existence of a photonic bandgap such as those seen in semiconductor materials and/or crystals. Via such exemplary PCF designs the fiber's bandgap can be tailored with clever control of the hole structure parameters: hole diameter (d) and/or period (Λ). Such exemplary designs can provide transmission windows that can substantially match that of the background glass, tailoring of optical performance parameters such as dispersion and/or guided modal content, realization of fibers that are single mode in broad wavelength ranges (also known as endlessly single mode fibers) and/or, depending on the type of structure, mechanical properties substantially matching that of the glass. Certain exemplary PCFs can, but need not, be made by a relatively complex stack-and-draw technique and/or can require special handling considerations such as not allowing dust contamination and/or liquid or moisture from reaching the fiber facet as they can get sucked into the air holes due to capillary forces. Also, the power handling capabilities can, but need not, be limited by the material selected for the background glass.

The stack-and-draw technique can use a combination of glass capillaries and solid rods precisely stacked in a triangular and/or hexagonal arrangement inside a large tube to produce the preform for the PCF. The central capillary can be replaced by a glass rod to form the solid core.

Certain exemplary embodiments can provide a PCF where the core and/or effective cladding index are tailored by the design of hole diameter and/or pitch. The formulation of the V-parameter (or V-number, which is a dimensionless parameter that is often used in the context of step-index fibers to determine the number of modes) for a PCF can be represented as (Equation 1):

$$V_{PCF} = 2\pi \frac{\Lambda}{\lambda} \sqrt{n_{FM}^2(\lambda) - n_{FSM}^2(\lambda)} \quad (1)$$

Here $n_{FM}(\lambda)$ is the wavelength ($\lambda$) dependent effective index of the fundamental mode (FM) and $n_{FSM}(\lambda)$ is the corresponding effective index of the first cladding mode in the infinite periodic cladding structure. The higher-order mode cut-off (single mode boundary) can be associated with a value of $V_{PCF}=\pi$.

The single mode boundary condition requires $V_{PCF}<\pi$. But in some cases, corresponding to a low value of $V_{PCF}$ (e.g., $V_{PCF}<1$) the guiding might be weak (e.g., >1 dB/m), potentially causing the mode to expand beyond the core and into the cladding region. The lower limit can be chosen to be $V_{PCF}=1$. The condition with $V_{PCF}>\pi$ is for an exemplary multimode PCF, the condition with $V_{PCF}<1$ is where the mode penetrates deeply (e.g., twice the core diameter) into the cladding.

The design space for single mode operation is $1<V_{PCF}<\pi$. It is sometimes preferable to stay close to the single mode boundary condition ($V_{PCF}=\pi$), which can provide for increased robustness. For example, when $V_{PCF}<\pi$, the fiber is single mode. When $V_{PCF}>\pi$, the fiber is multimode. The closer $V_{PCF}$ is to $\pi$, the more the fundamental mode is contained in the core and the less it will be lost in the cladding. But there are other limitations that can affect the macro-bending loss, mode field area, and/or numerical aperture (NA). In general, as the NA decreases, the mode field of the single mode fiber and/or the macro-bending loss can increase. Also, a large mode field area (e.g., a field area that is twice the core area) can maximize the transmitted power density. Certain exemplary embodiments can provide a PCF with low macro-bending loss (e.g., <1 dB/m) over a wide spectral band (i.e., the range where the PCF is single mode) and/or a large mode field area for high (e.g., >1 W) power laser transmission.

Certain exemplary embodiments can utilize glass billet extrusion for making complex PCF preforms in a single step. An extruded preform for a PCF with large numbers of holes can be a 3-ring bismuth glass preform. A special die design along with advanced extrusion process controls can enable the fabrication of a 3-ring bismuth PCF with minimum loss of approximately 1.2 dB/m at approximately 1100 nm. Certain exemplary embodiments can utilize low melting temperature soft glasses, which can enable the opportunity to use extrusion techniques to precisely produce preforms with unique shapes and/or features. Certain exemplary PCF designs and/or fabrication techniques can enable low loss transmission (e.g., <1 dB/m) of high-power laser light (e.g., >1 W) with a large mode field area and/or good beam quality (e.g., $M^2 \sim 1$) over a broad transmission band (i.e., the transmission band where the PCF is single mode).

One or more exemplary solid core PCFs can be made from an extruded soft glass preform that defined by multiple circular arrays of air holes arranged such that their innermost points (with respect to the longitudinal axis of the PCF) define a substantially circular ring. In certain exemplary embodiments the number of holes can be the same for all rings. The first ring of holes can define the outer boundary of the solid core and subsequent rings can have a larger radius and/or their air holes can be rotated by 360°/(2 time the number of air holes) relative to their inner neighboring ring.

Figure 2:
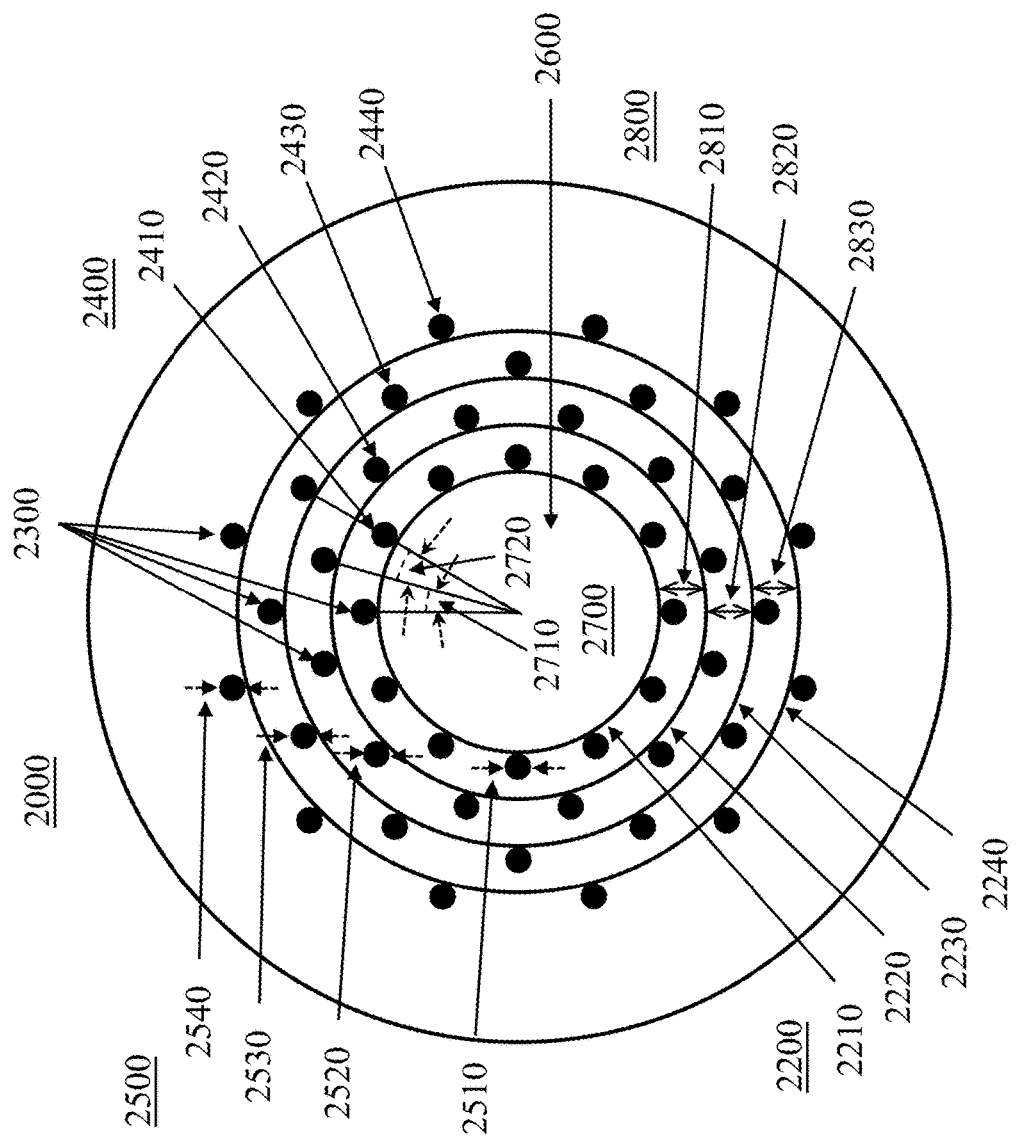
FIG. 2 is a cross-sectional view of an exemplary circular PCF.

FIG. 2 illustrates a schematic view of an exemplary embodiment of a circular PCF 2000 made of a single glass material. The multiple circular arrays 2400 (e.g., 2410, 2420, 2430, 2440 (each pointing to one air hole 2300 of their corresponding array) of air holes 2300 of circular PCF 2000 define multiple circular rings 2200 with twelve air holes 2300 per ring. The first ring 2410 defines the outer boundary of solid core 2600 and the air holes 2300 of the subsequent rings (e.g., 2420) are rotated by 15° relative to the previous ring (e.g., 2410). The rings have a spacing 2800. For example: ring 2220 is separated from ring 2210 by spacing 2810; ring 2230 is separated from ring 2220 by spacing 2820; and ring 2240 is separated from ring 2230 by spacing 2830. However, other embodiments can include a greater or smaller number of rings 2200 and/or holes 2300 and/or different ring spacings 2800. The hole diameters 2500 (e.g., 2510, 2520, 2530, 2540) and/or the rotation angle 2700 (e.g., angle 2710 represents the angle of rotation of ring 2220 with respect to ring 2210 and angle 2720 represents the angle of rotation of ring 2230 with respect to ring 2220) between successive rings 2200 can vary.

Figure 3:
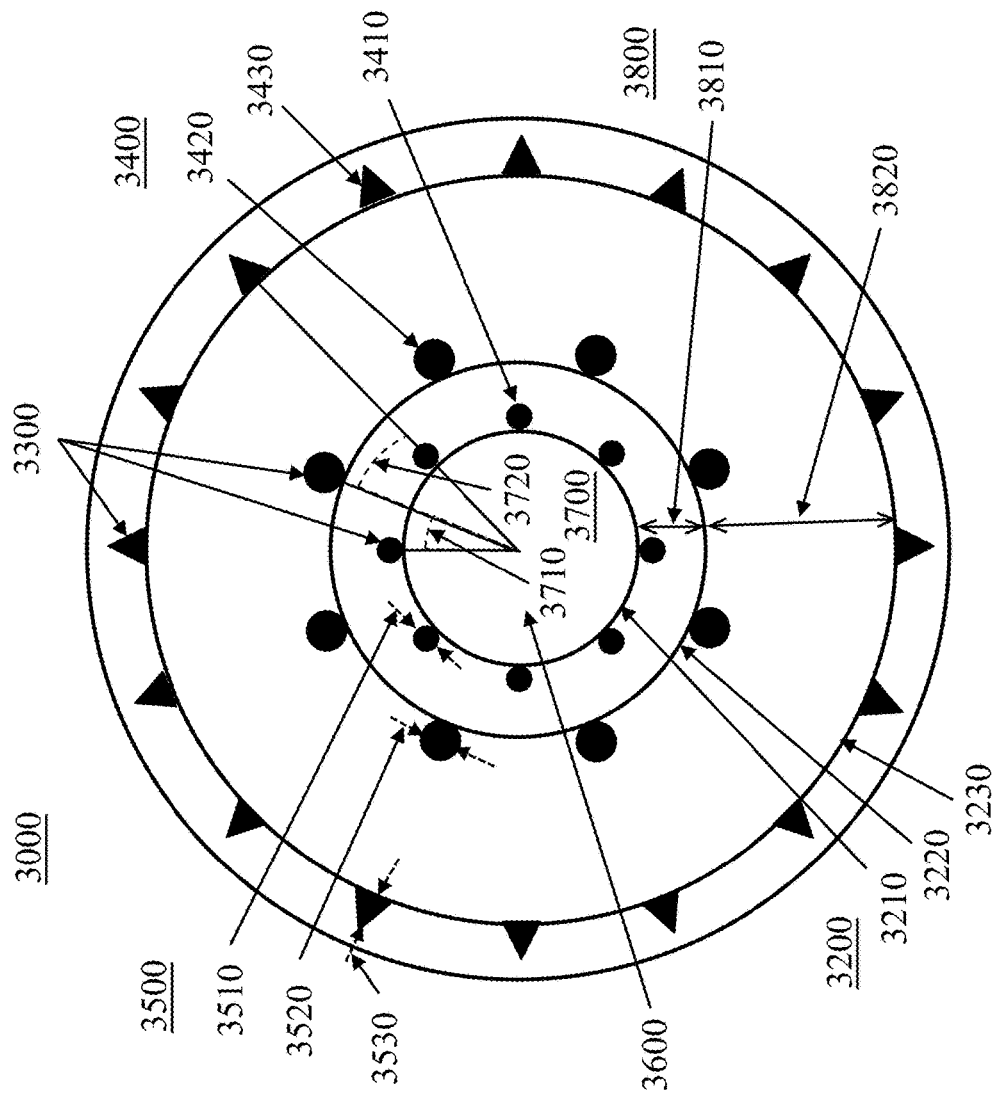
FIG. 3 is a cross-sectional view of an exemplary circular PCF.

As shown in FIG. 3, certain exemplary circular PCFs 3000 can have (with respect to PCF 2000 of FIG. 2) differing geometries, such as a different diameter for core 3600 (with respect to, e.g., core 2600), different number of rings 3200 (e.g., three for fiber 3000 vs. four for fiber 2000), number of holes 3300 per ring 3200 (e.g., an array 3410 of eight holes that defines innermost ring 3210 and an array 3420 of eight holes that defines ring 3220 and an array of 16 holes that defines ring 3230 vs. an array 2410 of twelve holes that defines innermost ring 2210 and an array 2420 of twelve holes that defines ring 2220 and an array 2430 of twelve holes that defines ring 2230), spaces 3800 between rings 3200 (compare, e.g., 2810 to 2820 vs. 3810 to 3820), cross-sectional shapes (e.g., circular, elliptical, oval, triangular, rectangle, square, generally polygonal, etc.) (compare, e.g., circular cross-section of the holes in array 3410 to the triangular cross-section of the holes in array 3430), and/or rotation angles 3700 between subsequent rings 3200 (compare e.g., angles 3710 (22.5°) and 3720 (22.5°) to angles 2710 (15°) and 2720 (15°)), those geometries producing different properties for the fiber 3000. For example, a circular PCF 3000 with relatively small core diameter defined by a first circular ring 3210 of relatively small array of holes 3410 can be surrounded by one or more rings 3200 (e.g., 3230) defined by one or more arrays 3400 (e.g., 3430) having relatively larger holes that can have a different ring spacing (e.g., 3820) to produce a relatively high NA and move the zero dispersion to relatively shorter wavelengths.

Certain exemplary embodiments can utilize a soft glass that has a relatively low melting temperature, <800° C., and/or can be extruded into rods or tubes of various shapes. Soft glasses for certain exemplary embodiments can include infrared glasses such as chalcogenide, fluoride, and/or tellurite, for example. As described in U.S. patent application Ser. No. 16/911,821, which is incorporated herein by reference in its entirety and for the portion that describes how to make PCFs, the soft glass can be inserted in a sleeve inside an oven and/or pushed with a piston through a die designed for the extrusion process. The extrusion die can be made of one or more metals such as stainless steel, titanium alloy, aluminum alloy, and/or Inconel, for example. The sleeve temperature can be adjusted to melt the soft glass to the desired viscosity. Lower sleeve temperatures can result in a higher viscosity and/or a higher load on the piston pushing on the soft glass, while higher temperatures can produce a lower viscosity and/or a lower load. For certain exemplary embodiments, the range of load for soft glass extrusion can be between about 30 kg and about 500 kg, such as between 50 kg and 150 kg. Such load ranges can help to preserve the desired shapes for the PCF 1000 and/or holes 1300.

Modeling and simulations with fiber-optic design software can be used to design certain exemplary circular PCFs 1000 made of chalcogenide glass. Chalcogenide glass, arsenic sulfide—$As_2S_3$, can transmit well (e.g., loss<1 dB/m) in the approximately 1.5 micron to approximately 6.5 microns wavelength range and/or can be extruded in a preform to draw the circular PCF. Certain exemplary circular PCF designs can be made to be single mode over an approximately 2 to approximately 6 microns wavelength range and/or to transmit high power laser (>55 W). Conservatively, for certain exemplary embodiments, the laser induced damage threshold (LIDT) of $As_2S_3$ glass can be approximately 22MW/cm$^2$.

Figure 4:
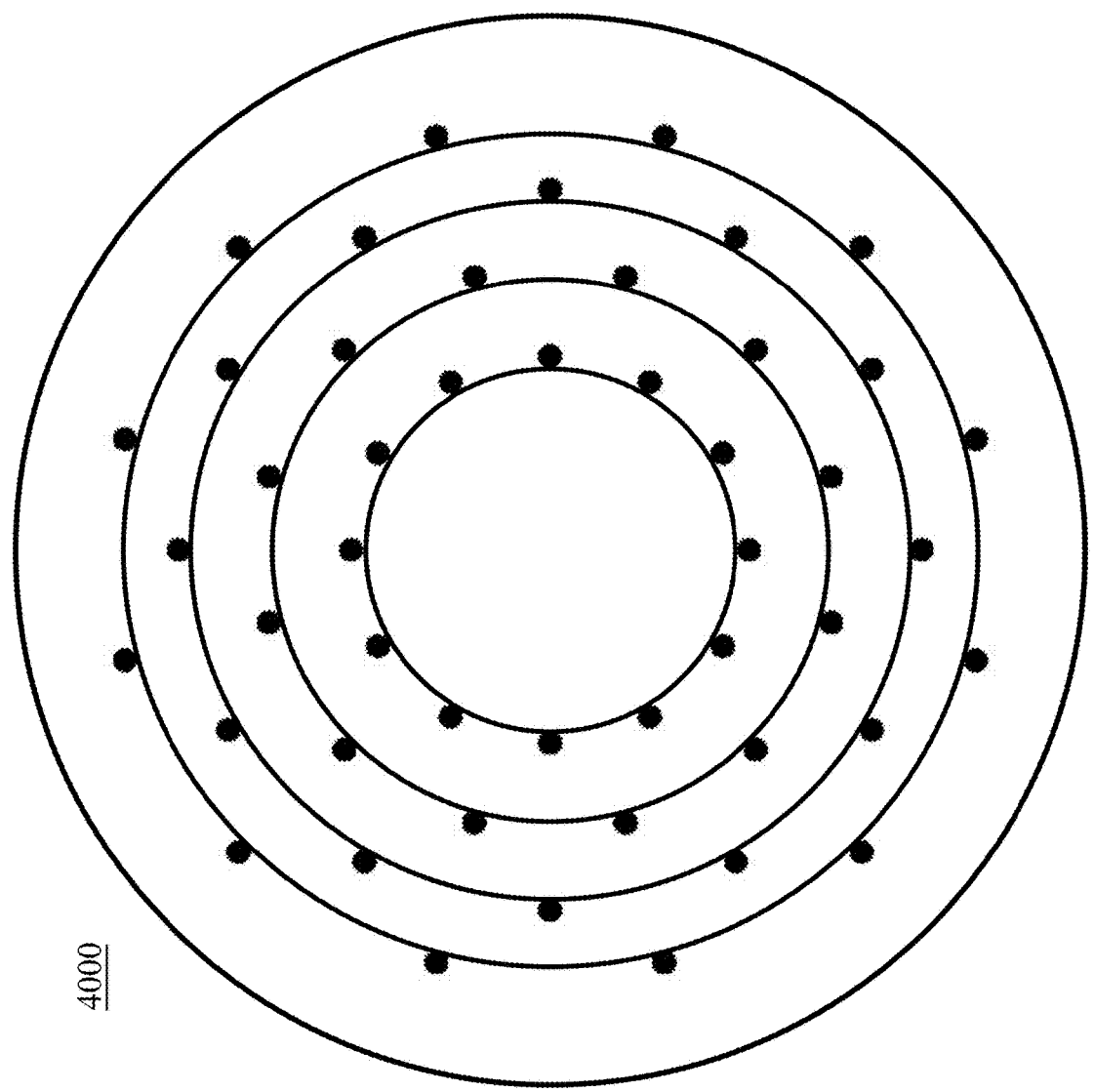
FIG. 4 is a cross-sectional view of an exemplary circular PDF used in a simulation.

Exemplary designs for a circular PCF, such as that shown in FIG. 4, were simulated with a radius of approximately 17.32 microns (a value that was below the LIDT for a laser with 55 W) for the first ring and with twelve holes with a diameter of approximately 2 microns. The subsequently larger diameter rings had 12 holes with diameter of approximately 2 microns and were rotated by approximately 150 relative to the previous ring. The space between the successively larger diameter rings from the innermost ring was gradually decreased from approximately 8 microns, to approximately 7 microns, and to approximately 6 microns for the outermost ring.

In simulations of this exemplary embodiment with the straight fiber configuration, we observed a nearly identical fundamental mode field diameter of 26.1 f 0.3 microns for all wavelengths between 2 microns and 6 microns and this circular PCF design can support approximately 58.7 W using the LIDT of approximately 22 MW/cm$^2$. The loss increased from 0.06 dB/m at 2 microns to 1.27 dB/m at 6 microns. In simulations with a bent fiber configuration (bend radius of 50 mm), the losses at the shorter wavelengths rapidly increased while the losses at longer wavelengths increased a small margin. At a 2 microns wavelength, the bent loss was 118.1 dB/m and the circular PCF did not transmit under 50 mm bend radius. At 6 microns wavelength, the bent loss was 2.23 dB/m and the fiber could still transmit under 50 mm bend radius. Additionally, for the bent configuration the field distribution at the shorter wavelengths was distorted and leaked through the side of the holey structure. In theory, this circular PCF was slightly multimode but the ability to alter both the outer holes' diameter along with their position allows the flexibility of tailoring the losses of higher order modes.

Figure 5:
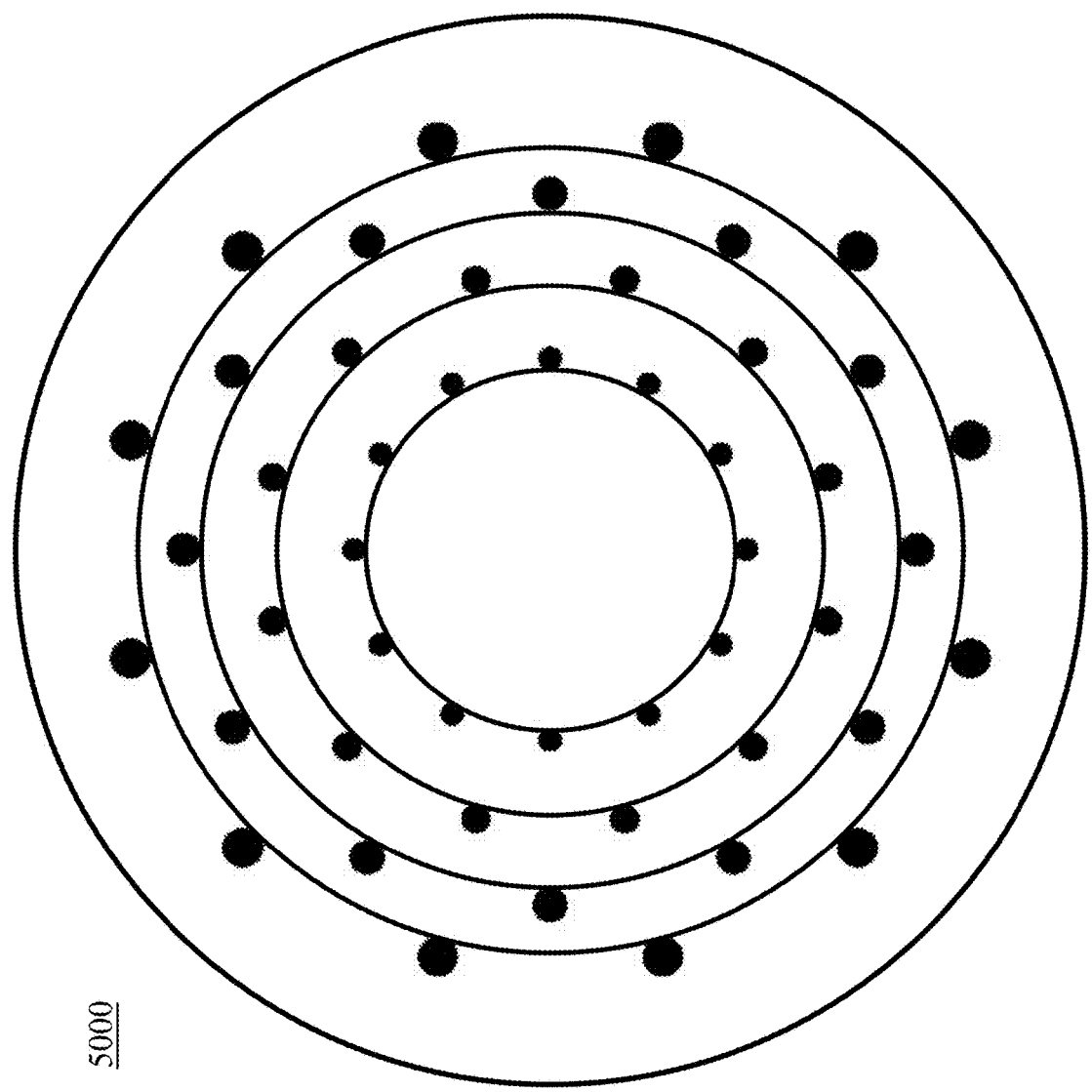
FIG. 5 is a cross-sectional view of an exemplary circular PDF used in a simulation.

To improve the leakage loss (with respect to the embodiment of FIG. 4), the position of the holes and/or their characteristic dimension (e.g., diameter, height, side length, perimeter, area, etc.) can be varied. The exemplary embodiment of FIG. 5 holds the same position of the holes as in the circular PCF design of FIG. 4 while continually increasing the holes diameter in steps of 0.5 micron per ring, going from 2 microns up to 3.5 microns in the radially outward direction. The exemplary embodiment shown in FIG. 5, when simulated, reduced (with respect to the exemplary bent fiber embodiment of FIG. 4) the bending loss at 2 microns to 59 dB/m, which means the fiber still does not transmit (the bending loss at which the fiber would transmit is <3 dB/m).

Figure 6:
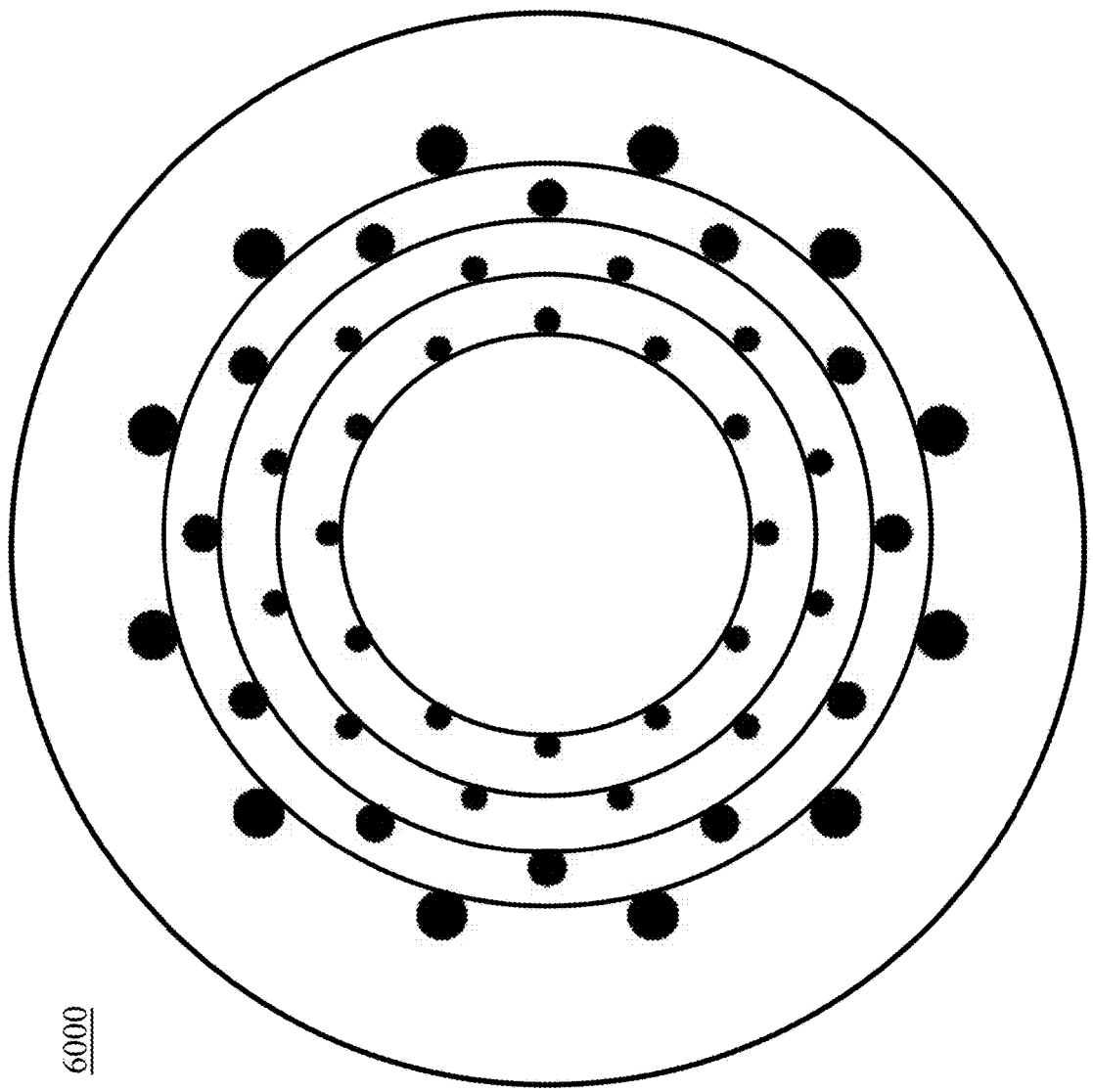
FIG. 6 is a cross-sectional view of an exemplary circular PDF used in a simulation.

In the exemplary embodiment of FIG. 6, the first (innermost) two rings have the same hole diameter of 2 microns while the third ring and fourth ring have hole diameters of 3 microns and 4 microns respectively. The first ring has a radius of 17.32 microns and the space between the successive rings is 5 microns. Note that this exemplary embodiment includes both hole size alterations as well as hole displacement. In particular, the first two rings have the same hole diameter of 2 microns while the third ring and fourth ring have hole diameters of 3 microns and 4 microns respectively. The first ring has a radius of 17.32 microns and the space between the successive rings is 5 microns. For these changes, the straight fiber configuration showed a decrease (with respect to the embodiment of FIG. 4) in leakage loss at 2 microns of at most one order of magnitude to 0.001 dB/m. However, the performance during a 50 mm bend radius showed a major improvement of the loss at 2 microns to 0.12 dB/m, 3 orders of magnitude improvement with respect to the bent embodiment of FIG. 4. The loss improvement in the bent fiber configuration showed the great flexibility of the circular PCF design and the advantages of not restricting the fiber's design to a hexagonal lattice structure with a single periodicity.

During simulation, the exemplary embodiment of FIG. 6 was quasi-single mode over the full 2 microns to 6 microns wavelength range. In the bent fiber configuration at 2 microns wavelength, the loss of the LP11o and LP11e modes was approximately 0.525 dB/m and approximately 1.902 dB/m respectively. The other higher order modes had bent loss>20 dB/m and were effectively lost when the fiber was normally used with tight bends. Furthermore, the circular PCF of FIG. 6 was effectively single mode when a nearly Gaussian beam was coupled in the center of the core. Then the beam was preferentially coupled in the fundamental mode and the other HOMs were not excited.

Certain above-mentioned exemplary embodiments can facilitate the collimation of the output laser light with relatively good beam quality and brightness over relatively long distances. Because the laser light with relatively good beam quality is transmitted over relatively broad wavelengths, guiding light in these circular PCFs can enable new applications due to the unique properties of these circular PCFs. An optical device comprising an exemplary circular PCF can be used to transmit light in the following exemplary and non-exhaustive applications/systems: LIDAR/LADAR (Light/Laser Detection and Ranging) systems, advanced driver assistance systems (ADAS), chemical sensing systems, medical laser systems for selective tissue ablation and cauterization, spectroscopy systems, supercontinuum source, broadband laser beam delivery systems, and/or mid-infrared transmission systems.

Exemplary preforms for forming certain PCFs described herein can be manufactured by one or more methods described in U.S. patent application Ser. No. 16/911,821, which is incorporated by reference herein in its entirety, for that portion describing such preforms and their manufacture, and that portion describing how to form PCFs from those preforms.

Certain exemplary embodiments can provide a substantially monolithic, elongated, photonic crystal fiber comprising:
  an elongated solid core that extends a length of the photonic crystal fiber and that defines a fiber longitudinal axis; and/or
  an elongated annular cladding extending the length of the photonic crystal fiber and is co-axial with the core;
  wherein the photonic crystal fiber defines:
    a circular fiber cross-section defined on a cross-sectional plane that extends perpendicularly to the fiber longitudinal axis;
    a plurality of longitudinally extending air holes;
    a first sub-plurality of longitudinally extending air holes from the plurality of longitudinally extending air holes have a first cross-sectional hole shape and are arranged on the circular fiber cross-section to define a first circular ring of a concentric plurality of circular rings on the circular fiber cross-section, each air hole from the first sub-plurality of longitudinally extending air holes having a characteristic cross-sectional dimension that is substantially equal to the characteristic cross-sectional dimension of each other air hole from the first sub-plurality of longitudinally extending air holes;
    a second sub-plurality of longitudinally extending air holes from the plurality of longitudinally extending air holes have a second cross-sectional hole shape and are arranged on the circular fiber cross-section to define a second circular ring of the concentric plurality of circular rings, the second circular ring located adjacent the first circular ring, the second circular ring having a diameter larger than a diameter of the first circular ring, each air hole from the second sub-plurality of longitudinally extending air holes having a characteristic cross-sectional dimension that is substantially equal to the characteristic cross-sectional dimension of each other air hole from the second sub-plurality of longitudinally extending air holes; and/or
    a third sub-plurality of longitudinally extending air holes from the plurality of longitudinally extending air holes have a third cross-sectional hole shape and are arranged on the circular fiber cross-section to define a third circular ring of the concentric plurality of circular rings, the third circular ring located adjacent the second circular ring, the third circular ring having a diameter larger than the diameter of the second circular ring, each air hole from the third sub-plurality of longitudinally extending air holes having a characteristic cross-sectional dimension that is substantially equal to the characteristic cross-sectional dimension of each other air hole from the third sub-plurality of longitudinally extending air holes;
  and/or wherein:
    the number of longitudinally extending air holes of each circular ring of the concentric plurality of circular rings is equal;
    the characteristic cross-sectional dimension of each longitudinally extending air hole in at least one circular array of longitudinally extending air holes from the plurality of longitudinally extending air holes is substantially different from the characteristic cross-sectional dimension of each longitudinally extending air hole in another circular array of longitudinally extending air holes from the plurality of longitudinally extending air holes.
A radial position of the second sub-plurality of longitudinally extending air holes from the plurality of longitudinally extending air holes is rotated by 360 degrees/(two times the number of longitudinally extending air holes in the second sub-plurality of longitudinally extending air holes from the plurality of longitudinally extending air holes) about the fiber longitudinal axis with respect to a radial position of the first sub-plurality of longitudinally extending air holes from the plurality of longitudinally extending air holes;
a radial position of the third sub-plurality of longitudinally extending air holes from the plurality of longitudinally extending air holes is rotated by 360 degrees/(two times the number of longitudinally extending air holes in the third sub-plurality of longitudinally extending air holes from the plurality of longitudinally extending air holes) about the fiber longitudinal axis with respect to a radial position of the second sub-plurality of longitudinally extending air holes from the plurality of longitudinally extending air holes;
a radial position of the second sub-plurality of longitudinally extending air holes from the plurality of longitudinally extending air holes is rotated a different amount about the fiber longitudinal axis (with respect to a radial position of the first sub-plurality of longitudinally extending air holes from the plurality of longitudinally extending air holes) than a radial position of the third sub-plurality of longitudinally extending air holes from the plurality of longitudinally extending air holes;
a set of longitudinally extending air holes from the plurality of longitudinally extending air holes define a ring and are equally radially distributed along that ring and about the fiber longitudinal axis;
a set of longitudinally extending air holes from the plurality of longitudinally extending air holes define a ring and are not equally radially distributed along that ring and about the fiber longitudinal axis;
the characteristic cross-sectional dimension of each longitudinally extending air hole in a first pre-selected sub-plurality of longitudinally extending air holes from the plurality of longitudinally extending air holes is equal to the characteristic cross-sectional dimension of each longitudinally extending air hole in a second pre-selected sub-plurality of longitudinally extending air holes from the plurality of longitudinally extending air holes, the first pre-selected sub-plurality of longitudinally extending air holes from the plurality of longitudinally extending air holes defining a first predetermined ring from the concentric plurality of circular rings, the second pre-selected sub-plurality of longitudinally extending air holes from the plurality of longitudinally extending air holes defining a second predetermined ring from the concentric plurality of circular rings;
the number of longitudinally extending air holes in a first pre-selected sub-plurality of longitudinally extending air holes from the plurality of longitudinally extending air holes is different from the number of longitudinally extending air holes in a second pre-selected sub-plurality of longitudinally extending air holes from the plurality of longitudinally extending air holes, the first pre-selected sub-plurality of longitudinally extending air holes from the plurality of longitudinally extending air holes defining a first predetermined ring from the concentric plurality of circular rings, the second pre-selected sub-plurality of longitudinally extending air holes from the plurality of longitudinally extending air holes defining a second predetermined ring from the concentric plurality of circular rings;
a spacing between the second circular ring and the first circular ring is substantially equal to a spacing between the second circular ring and the third circular ring;
a spacing between the second circular ring and the first circular ring is different from a spacing between the second circular ring and the third circular ring;
the photonic crystal fiber is configured to operatively transmit light in a single mode;
the photonic crystal fiber is configured to operatively transmit light in a single mode, a large mode area of the photonic crystal fiber is greater than 175 square microns, and the photonic crystal fiber is configured to operatively transmit a laser power greater than 1 Watt;
a transmission loss for light traveling the length of the photonic crystal fiber and having a wavelength of from about 2 microns to about 15 microns is less than 1000 decibels per kilometer;
the photonic crystal fiber comprises a transparent glass material that comprises chalcogenide, fluoride, or tellurite;
each of a predetermined sub-plurality of longitudinally extending air holes from the plurality of longitudinally extending air holes has a cross-sectional hole shape selected from circular, elliptical, rectangular, and triangular;
each longitudinally extending air hole from the plurality of longitudinally extending air holes has the same shape;
a predetermined sub-plurality of longitudinally extending air holes from the plurality of longitudinally extending air holes has the same shape;
all longitudinally extending air holes of a first predetermined ring have a different shape than all longitudinally extending air holes of a second predetermined ring;
all longitudinally extending air holes of a predetermined ring have a common shape;
a predetermined subset of longitudinally extending air holes from a predetermined ring have a different shape than the remainder of holes of the predetermined ring;
a first cross-sectional diameter of the photonic crystal fiber at a first location along the length of the photonic crystal fiber is different from a second cross-sectional diameter of the photonic crystal fiber at a second location along the length of the photonic crystal fiber;
the cross-sectional diameter of the photonic crystal fiber changes linearly from a first location along the length of the photonic crystal fiber to a second location along the length of the photonic crystal fiber;
the cross-sectional diameter of the photonic crystal fiber changes linearly and adiabatically from a first location along the length of the photonic crystal fiber to a second location along the length of the photonic crystal fiber; and/or the number of circular rings in the concentric plurality of circular rings is greater than three.

Certain exemplary embodiments can provide an optical device comprising the photonic crystal fiber such as described in the above paragraph, the below paragraph, and/or elsewhere herein, and at least one of:
a LIDAR/LADAR (Light/Laser Detection and Ranging) system;
an advanced driver assistance systems (ADAS) system;
a medical laser device;
a chemical sensor;
a spectroscopy instrument;
a supercontinuum source;
a broadband laser beam delivery device; and a mid-infrared transmission system.

Certain exemplary embodiments can provide a substantially monolithic, elongated, photonic crystal fiber comprising:
an elongated solid core that extends a length of the photonic crystal fiber and that defines a fiber longitudinal axis; and/or
an elongated annular cladding extending the length of the photonic crystal fiber and is co-axial with the core;
wherein the photonic crystal fiber defines:
a circular fiber cross-section defined on a cross-sectional plane that extends perpendicularly to the fiber longitudinal axis;
a plurality of longitudinally extending air holes;
a first sub-plurality of longitudinally extending air holes from the plurality of longitudinally extending air holes have a first cross-sectional hole shape and are arranged on the circular fiber cross-section to define a first circular ring of a concentric plurality of circular rings on the circular fiber cross-section, each air hole from the first sub-plurality of longitudinally extending air holes having a characteristic cross-sectional dimension that is substantially equal to the characteristic cross-sectional dimension of each other air hole from the first sub-plurality of longitudinally extending air holes;
a second sub-plurality of longitudinally extending air holes from the plurality of longitudinally extending air holes have a second cross-sectional hole shape and are arranged on the circular fiber cross-section to define a second circular ring of the concentric plurality of circular rings, the second circular ring located adjacent the first circular ring, the second circular ring having a diameter larger than a diameter of the first circular ring, each air hole from the second sub-plurality of longitudinally extending air holes having a characteristic cross-sectional dimension that is substantially equal to the characteristic cross-sectional dimension of each other air hole from the second sub-plurality of longitudinally extending air holes; and/or
a third sub-plurality of longitudinally extending air holes from the plurality of longitudinally extending air holes have a third cross-sectional hole shape and are arranged on the circular fiber cross-section to define a third circular ring of the concentric plurality of circular rings, the third circular ring located adjacent the second circular ring, the third circular ring having a diameter larger than the diameter of the second circular ring, each air hole from the third sub-plurality of longitudinally extending air holes having a characteristic cross-sectional dimension that is substantially equal to the characteristic cross-sectional dimension of each other air hole from the third sub-plurality of longitudinally extending air holes;
and/or wherein:
the number of longitudinally extending air holes of each circular ring of the concentric plurality of circular rings is equal; and/or
the characteristic cross-sectional dimension of each longitudinally extending air hole from the plurality of longitudinally extending air holes is substantially equal.

Definitions

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.
about—around and/or approximately.
above—at a higher level.
across—from one side to another.
activity—an action, act, step, and/or process or portion thereof.
adapt—to design, make, set up, arrange, shape, configure, and/or make suitable and/or fit for a specific purpose, function, use, and/or situation.
adapter—a device used to effect operative compatibility between different parts of one or more pieces of an apparatus or system.
adiabatic—without loss during transmission.
adjacent—in close proximity to, near, next to, adjoining, and/or neighboring.
advanced driver assistance systems (ADAS)—automated electronic technologies configured to assist drivers in driving and/or parking functions, the technologies providing a safe human-machine interface and configured to increase car and/or road safety using sensors and/or cameras to detect nearby obstacles and/or driver errors and respond accordingly.
after—following in time and/or subsequent to.
air—the earth's atmospheric gas.
along—through, on, besides, over, in line with, and/or parallel to the length and/or direction of; and/or from one end to the other of.
and—in conjunction with.
and/or—either in conjunction with or in alternative to.
annular—shaped like a ring.
another—a different one.
any—one, some, every, and/or all without specification.
apparatus—an appliance or device for a particular purpose.
approximately—about and/or nearly the same as.
are—to exist.
area—a surface with determinable boundaries; and/or the measure of the space within a 2-dimensional region.
around—about, surrounding, and/or on substantially all sides of; and/or approximately.

arrange—to dispose in a particular order.

as long as—if and/or since.

associate—to join, connect together, and/or relate.

at—in, on, and/or near.

at least—not less than, and possibly more than.

axis—a straight line about which a body and/or geometric object rotates and/or can be conceived to rotate and/or a center line to which parts of a structure and/or body can be referred.

based on—indicating one or more factors that affect a determination, but not necessarily foreclosing additional factors that might affect that determination.

beam—a stream of photons moving in the same general direction.

beam parameter product (BPP)—a metric for specifying the beam quality of a laser beam, and calculated by the product of (a laser's) beam radius (measured at the beam waist) and the beam divergence half-angle (measured in the far field). Typically measured in mm mrad (millimeters times milliradians). Generally, the higher the beam parameter product, the lower the beam quality. A BPP also can be defined for non-Gaussian beams. The smallest possible beam parameter product can be obtained via a diffraction-limited Gaussian beam, namely $\lambda/\pi$.

between—in a separating interval and/or intermediate to.

birefringence—dividing a ray of light into two unequally refracted polarized rays (known as the ordinary and extraordinary rays), the directions of polarization of the rays being at right angles to each other; double refraction.

broadband—within a wavelength band of approximately 1 micron to approximately 20 microns, including all values and subranges therebetween.

by—via and/or with the use and/or help of.

can—is capable of, in at least some embodiments.

cane—a temporary shape into which a preform can be formed (e.g., extruded and/or drawn) before being further processed (e.g., by further drawing) into an optical fiber.

Cartesian—relating to a system in which numbers indicate the location of a point relative to a fixed reference point (the origin), being its shortest (perpendicular) distances from two fixed axes (or three planes defined by three fixed axes) that intersect at right angles at the origin.

cause—to bring about, provoke, precipitate, produce, elicit, be the reason for, result in, and/or effect.

chalcogen—any of the elements appearing in Group 6a of the periodic table, sharing certain chemical properties; oxygen, sulfur, selenium, tellurium, polonium, or element 116.

chalcogenide—a chemical compound comprising a chalcogen anion and one or more electropositive elements.

change—(v.) to cause to be different; (n.) the act, process, and/or result of altering or modifying.

characteristic—a distinguishing feature, property, trait, and/or attribute.

chemical—any substance used in and/or resulting from a reaction involving changes to atoms and/or molecules, especially one derived artificially for practical use; and/or of or relating to chemistry and/or chemicals.

circular—a substantially round shape in which all points on a perimeter of the shape are substantially equidistant from a center of the shape; round; and/or having the shape of a circle.

circularity—the ratio of short radius to long radius of a 2-dimensional substantially elliptical shape.

cladding—a covering or coating on a structure or material.

closed—the result of closing, having boundaries, and/or enclosed.

co-axial—two or more objects that are located on, around, or in the direction of a common axis.

collection—a plurality.

common—shared and/or same.

composition of matter—a combination, reaction product, compound, mixture, formulation, material, and/or composite formed by a human and/or automation from two or more substances and/or elements.

comprising—including but not limited to.

conceive—to imagine, conceptualize, form, and/or develop in the mind.

concentric—having a common central axis.

configure—to design, arrange, set up, shape, and/or make suitable and/or fit for a specific purpose, function, use, and/or situation.

configured to—designed, arranged, set up, shaped, and/or made suitable and/or fit for a specific purpose, function, use, and/or situation, and/or having a structure that, during operation, will perform the indicated activity(ies). To the extent relevant to the current application, the use of "configured to" is expressly not intended to invoke 35 U.S.C. § 112(f) for that structure.

connect—to join or fasten together.

consisting—including only.

containing—including but not limited to.

convert—to transform, adapt, and/or change.

core—a substantially innermost and/or central, and potentially removable, object around which another material will be placed, cast, formed, and/or drawn.

corresponding—related, associated, accompanying, similar in purpose and/or position, conforming in every respect, and/or equivalent and/or agreeing in amount, quantity, magnitude, quality, and/or degree.

couplable—capable of being joined, connected, and/or linked together.

coupling—linking in some fashion.

create—to bring into being.

cross-section—a section formed by a plane cutting through an object at a right angle to an axis.

crystal—a solid substance whose atoms are arranged with periodic geometric regularity, called a lattice; a homogenous solid formed by a repeating, three-dimensional pattern of atoms, ions, or molecules and having fixed distances between constituent parts; and/or a single grain or mass of a crystalline substance.

decibel—a unit used to express relative difference in power or intensity, usually between two acoustic or electric signals, equal to ten times the common logarithm of the ratio of the two levels; symbol dB.

decrease—to be smaller in magnitude.

define—to establish the meaning, relationship, outline, form, and/or structure of; and/or to precisely and/or distinctly describe and/or specify.

degree—a unit of angular measure equal in magnitude to 1/360 of a complete revolution in a predetermined plane.

delivery—an act of conveying and/or transferring.

derive—to receive, obtain, and/or produce from a source and/or origin.

detection—an act of sensing and/or perceiving.

determine—to find out, obtain, calculate, decide, deduce, ascertain, and/or come to a decision, typically by investigation, reasoning, and/or calculation.

device—a machine, manufacture, and/or collection thereof.

diameter—a thickness of an elliptical object.

die—a tool of metal, silicon carbide, and/or other hard material having one or more holes through which elongated structures, such as wires, rods, and/or tubes, are drawn to reduce their diameter.

differ—to be different, changed, distinct, and/or separate from.

difference—a value obtained via a subtraction of a first quantity from a second quantity; and/or a point of unlikeness and/or dissimilarity.

different—changed, distinct, and/or separate.

dimension—an extension in a given direction and/or a measurement in length, width, or thickness.

each—every one of a group considered individually.

effective—sufficient to bring about, provoke, elicit, and/or cause.

elliptical—of, relating to, and/or having the shape of an ellipse elongated—drawn out, made spatially longer, and/or having more length than width.

embodiment—an implementation, manifestation, and/or concrete representation.

equal—substantially the same as.

estimate—(n) a calculated value approximating an actual value; (v) to calculate and/or determine approximately and/or tentatively.

exemplary—serving as an example, instance, and/or illustration.

extending—existing, located, placed, and/or stretched lengthwise.

extrude—to shape a material by forcing it through a die.

fiber—a slender, elongated structure of relatively small, uniform diameter having a much greater length, which may have a relatively short finite length or an indeterminate length.

first—a label for a referenced element in one or more patent claims, but that label does not necessarily imply any type of ordering to how that element (or any other elements of a similar type) is implemented in embodiments of the claimed subject matter.

fluoride glass—non-oxide optical glasses composed of fluorides of various metals (e.g., $ZrF_4$, $BaF_2$, $LaF_3$, $AlF_3$, NaF).

for—with a purpose of.

form—to make, produce, create, generate, construct, and/or shape.

from—used to indicate a source, origin, and/or location thereof.

further—in addition.

generate—to create, produce, render, give rise to, and/or bring into existence.

given—predetermined and/or specific.

glass—an inorganic product (a) the constituents of which generally include a glass former (e.g., $As_2O_3$, $B_2O_3$ $GeO_2$, $P_2O_5$, $SiO_2$, $V_2O_5$, chalcogenide, fluoride, and/or tellurite, etc.) which has an essential characteristic of creating and/or maintaining, singly, and/or in a mixture, that type of structural disorder characteristic of a glassy condition, other oxides that approach glass forming properties (e.g., $Al_2O_3$, BeO, PbO, $Sb_2O_3$, $TiO_2$, ZnO, and/or $ZrO_2$, etc.) and/or as oxides that are practically devoid of glass forming tendencies (e.g., BaO, CaO, $K_2O$, $Li_2O$, MgO, $Na_2O$, and/or SrO, etc.), however, pure and modified silica, silicon, and slag are also included; (b) that is formed by fusion and cooled to a rigid condition generally without crystallization; (c) that has no definite melting point (whereby the mass has the characteristic of passing through a plastic state before reaching a liquid state when heated); (d) that is incapable in the solid state of permanent deformation; and/or (e) that fractures when subject to deformation tension.

glass fiber—a thin flexible fiber with a glass core through which light signals can be sent with very little loss of strength.

greater than—larger and/or more than.

group—(n.) a number of individuals or things considered together, possibly because of similarities; (v.) to associate a number of individuals or things such that they are considered together and/or caused to have similar properties.

guide—(v) to direct, steer, and/or exert control and/or influence over.

guided mode—in an optical waveguide, a mode whose field decays monotonically in the transverse direction everywhere external to the core and which does not lose power to radiation. Also called bound mode.

have—to possess as a characteristic, quality, or function.

having—possessing, characterized by, comprising, and/or including, but not limited to.

heating—transferring energy from one substance to another resulting in an increase in temperature of one substance.

hole—an aperture that extends through its object and/or defines a substantially constant cross-sectional shape along its longitudinal axis.

including—having, but not limited to, what follows.

initialize—to prepare something for use and/or some future event.

install—to connect or set in position and prepare for use.

instrument—a device for recording, measuring, or controlling, especially such a device functioning as part of a control system; and/or a tool or implement used to do or facilitate work, one used for precision work; and/or a device for measuring the present value of a quantity under observation.

into—to a condition, state, or form of.

is—to exist in actuality.

kilometer—one thousand meters; symbol km.

LADAR—a tracking system that uses a light beam in place of a microwave radar beam to obtain measurements of speed, altitude, direction, and/or range of moving objects; a.k.a., colidar and/or laser radar; derived from laser detecting and ranging.

large mode area—a waveguide for which, while maintaining single mode performance, the numerical aperture is <0.1 and the core diameter is >5 times the wavelength.

larger—greater in magnitude.

laser—a source of high-intensity optical, infrared, or ultraviolet radiation produced as a result of stimulated emission maintained within a solid, liquid, or gaseous medium, whereby the photons involved in the emission process all have the same energy and phase so that the laser beam is monochromatic and coherent, allowing it to be brought to a fine focus; and/or any similar source producing a beam of any electromagnetic radiation, such as infrared or microwave radiation.

leakage—a loss and/or undesired leakage, such as of photons.

length—a longest dimension of something and/or the measurement of the extent of something along its greatest dimension.

less than—having a measurably smaller magnitude and/or degree as compared to something else.

LIDAR—equipment and/or methods for measuring distances by illuminating the target with laser light and measuring the reflection with a sensor, whereby differences in laser return times and wavelengths can then be used to make digital 3-D representations of the target.

light—optical wavelengths, i.e., that part of the spectrum extending from the near infrared, through the visible, to the ultraviolet, but also includes those portions of the spectrum that extend from the near infrared through the long wavelength, far infrared, and from the ultraviolet to X-rays and gamma rays at the shortest wavelengths.

located—situated in a particular spot, region, and/or position.

location—a place where, and/or substantially approximating where, something physically exists.

long—of relatively more than a reference; extending and/or traveling a relatively greater distance than another.

longitudinal—of and/or relating to a length; placed and/or running lengthwise.

longitudinal axis—a straight line defined parallel to an object's length and passing through a centroid of the object.

loss—a decline in amount and/or activity.

$M^2$ factor—a measure of the beam quality of a laser beam, which is also known as "beam quality factor" and "beam propagation factor", and which is defined, per ISO Standard 11146, as the beam parameter product divided by $\lambda/\pi$, the latter being the beam parameter product for a diffraction-limited Gaussian beam with the same wavelength. A diffraction-limited Gaussian beam has an $M^2$ factor of 1. Note that $M^2>1$ represents the degree of variation of a beam from an ideal Gaussian beam.

made—produced, generated, and/or performed.

maintain—to retain, preserve, sustain, keep in an existing state, and/or continue to obtain.

material—a substance and/or composition.

may—is allowed and/or permitted to, in at least some embodiments.

medical—of or relating to the study or practice of medicine.

melt—to be changed from a solid to a liquid state, especially by the application of heat; to soften; and/or to cause to flow.

method—one or more acts that are performed upon subject matter to be transformed to a different state or thing and/or are tied to a particular apparatus, said one or more acts not a fundamental principal and not preempting all uses of a fundamental principal.

micron—a unit of length equal to one thousandth (10-3) of a millimeter or one millionth (10-6) of a meter. Also called micrometer.

mid-infrared—having and/or relating to light and/or radiation having a wavelength ranging from approximately 2 μm to approximately 10 μm and/or a frequency in the range of approximately 30 THz to approximately 150 THz.

mode—in a waveguide or cavity, one of the various possible patterns of propagating or standing electromagnetic fields. Each mode is typically characterized by angle, frequency, polarization, electric field strength, and/or magnetic field strength. For example, when a pulse of light is transmitted through an optical fiber, the energy can follow a number of paths that cross the fiber's longitudinal axis at different angles. A group of paths that cross the axis at the same angle is known as a mode.

monolithic—constituting and/or acting as a single, substantially uniform and/or unbroken, whole.

more—a quantifier meaning greater in size, amount, extent, and/or degree.

multimode—a waveguide that supports more than one mode.

no—an absence of and/or lacking any.

non-destructively—to perform substantially without damaging.

number—a count and/or quantity.

numerical aperture—a measure for the maximum angular acceptance for incoming light that can be coupled in an optical system without loss.

one—being and/or amounting to a single unit, individual, and/or entire thing, item, and/or object.

operable—practicable and/or fit, ready, and/or configured to be put into its intended use and/or service.

operative—when in operation for its intended use and/or service.

opposing—opposite; against; being the other of two complementary and/or mutually exclusive things; placed and/or located opposite, in contrast, in counterbalance, and/or across from something else and/or from each other.

optical—relating to light.

or—a conjunction used to indicate alternatives, typically appearing only before the last item in a group of alternative items.

orientation—a location and/or position relative to something else.

orthogonal—perpendicular and/or at right angles.

other—a different and/or distinct entity and/or not the same as already mentioned and/or implied.

outside—beyond a range, boundary, and/or limit; and/or not within.

over-clad—(v) to provide and/or apply a secondary and/or additional cladding.

overlap—to extend over and cover a part of.

pair—a quantity of two of something.

parallel—of, relating to, and/or designating lines, curves, planes, and/or surfaces everywhere equidistant.

per—for each and/or by means of.

period—a time interval.

perpendicular—intersecting at or forming substantially right angles.

photon—the elementary particle of light and other electromagnetic radiation; the quantum of electromagnetic energy. The photon is the massless, neutral vector boson that mediates electromagnetic interactions.

photonic—the branch of technology concerned with the properties and transmission of photons, for example, in fiber optics.

pin—a slender, sometimes cylindrical member.

plane—a substantially flat surface and/or a surface containing all the straight lines that connect any two points on it.

plurality—the state of being plural and/or more than one.

polarization—(definition 1) in a beam of polarized electromagnetic radiation, the polarization direction is the direction of the electric field vector (with no distinction between positive and negative as the field oscillates back and forth). The electric field vector is always in the plane which is normal to the beam propagation direction. At a given stationary point in space, the electric field vector of a beam can vary with time at random (unpolarized beam), can remain constant (plane-polarized beam), or can rotate. In the latter two cases, the beam is said to be "polarized" and can be thought of as the resultant vector of two orthogonal component vectors having equal amplitudes. If the phase difference of the two component vectors is 0 degrees, the light is plane polarized; if 90 degrees, the light is circularly polarized; and if it is between 0 and 90 degrees, the light is elliptically polarized. Elliptical and plane polarized light can be converted into each other by means of birefringent optical systems which retard one of the orthogonal component vectors relative to the other.

polarization—(definition 2) and/or, that property of a radiated electromagnetic wave describing the time-varying direction and amplitude of the electric field vector; specifically, the figure traced as a function of time by the extremity of the vector at a fixed location in space, as observed along the direction of propagation. Typically, the figure is elliptical and is traced in a clockwise or counterclockwise sense. The commonly referenced circular and linear polarizations are obtained when the ellipse becomes a circle or a straight line, respectively. Clockwise sense rotation of the electric vector is designated right-hand polarization and counterclockwise sense rotation is designated left-hand polarization.

portion—a part, component, section, percentage, ratio, and/or quantity that is less than a larger whole.

position—(n) a place and/or location, often relative to a reference point. (v) to place and/or locate.

power—energy, a measure of energy and/or work, and/or a rate at which work is done, expressed as the amount of work per unit time and commonly measured in units such as watt and horsepower.

pre-—a prefix that precedes an activity that has occurred beforehand and/or in advance.

pre-selected—chosen from a plurality of alternatives in advance.

predetermine—to determine, obtain, calculate, decide, and/or establish in advance.

preform—an object that has been subjected to preliminary, usually incomplete shaping and/or molding before undergoing additional, complete, and/or final processing.

prevent—to hinder, avert, and/or keep from occurring.

prior—before and/or preceding in time or order.

probability—a quantitative representation of a likelihood of an occurrence.

product—something produced by human and/or mechanical effort.

project—to calculate, estimate, or predict.

provide—to furnish, supply, give, and/or make available.

pull—to draw with force, and/or to remove from a fixed position, to extract, and/or to apply force to so as to cause and/or tend to cause motion toward the source of the force.

quadrant—one of four parts into which a plane is divided by two substantially perpendicular lines.

radial—pertain to that which radiates from and/or converges to a common center; along a radius.

radius—a distance from an approximate center of an object to a curved boundary of the object.

range—a measure of an extent of a set of values and/or an amount and/or extent of variation.

ranging—a process of establishing the distance to a target and/or an observed object, wherein the types of ranging include radar, echo, intermittent, manual, explosive echo, optical, radar, and/or laser, and the process includes measurement of the range for both air-to-air and air-to-ground targets.

ratio—a relationship between two quantities expressed as a quotient of one divided by the other.

receive—to get as a signal, take, acquire, and/or obtain.

recommend—to suggest, praise, commend, and/or endorse.

rectangular—defined by four substantially right angles.

reduce—to make and/or become lesser and/or smaller.

remove—to eliminate, remove, and/or delete, and/or to move from a place or position occupied.

repeat—to do again and/or perform again.

repeatedly—again and again; repetitively.

request—to express a desire for and/or ask for.

respectively—singly in the order designated and/or mentioned.

result—(n.) an outcome and/or consequence of a particular action, operation, and/or course; (v.) to cause an outcome and/or consequence of a particular action, operation, and/or course.

ring—a circular object, form, line, and/or arrangement.

rotate—to turn about an axis.

said—when used in a system or device claim, an article indicating a subsequent claim term that has been previously introduced.

second—a label for an element in one or more patent claims, the element other than a "first" referenced element of a similar type, but the label does not necessarily imply any type of ordering to how that "second" element or the "first" element is implemented in embodiments of the claimed subject matter, and unless stated otherwise, does not necessarily limit the number of referenced elements to two.

select—to make a choice and/or selection from alternatives.

selected—chosen from a plurality of alternatives.

sensor—a device adapted to automatically sense, perceive, detect, and/or measure a physical property (e.g., pressure, temperature, flow, mass, heat, light, sound, humidity, proximity, position, velocity, vibration, loudness, voltage, current, capacitance, resistance, inductance, magnetic flux, and/or electro-magnetic radiation, etc.) and convert that physical quantity into a signal. Examples include position sensors, proximity switches, stain gages, photo sensors, thermocouples, level indicating devices, speed sensors, accelerometers, electrical voltage indicators, electrical current indicators, on/off indicators, and/or flowmeters, etc.

set—a related plurality.

shape—a characteristic surface, outline, and/or contour of an entity.

short—of relatively less than a reference; not long.

single—existing alone and/or consisting of one entity.

single mode—(1) for light waves traveling through a given optical fiber, the electromagnetic field pattern in the plane perpendicular (i.e., transverse) to the light's propagation direction, that pattern occurring due to boundary conditions imposed on the waves by that optical fiber; (2) an optical fiber having a V-parameter of less than 2.405; (3) for light waves traveling through a given optical fiber, the condition in which there exists only a single propagation mode per polarization direction for a given wavelength such that higher order modes do not exist in the core and the transverse intensity profile at the fiber output has a fixed shape that is independent of the launch conditions and the spatial properties of the injected light.

soft—not rough, abrasive, or harsh to the touch.

solid—neither liquid nor gaseous, but instead of definite shape and/or form.

source—an original transmitter, device, and/or a point at which something originates, springs into being, and/or from which it derives and/or is obtained.

spacing—a separation.

species—a class of individuals and/or objects grouped by virtue of their common attributes and assigned a common name; a division subordinate to a genus.

spectroscopy—an analytic technique concerned with the measurement of the interaction (usually the absorption or the emission) of radiant energy with matter, with the instruments necessary to make such measurements, and with the interpretation of the interaction both at the fundamental level and for practical analysis; and/or the science and practice of using spectrometers and spectroscopes and of analyzing spectra, the methods employed depending on the radiation being examined. The techniques are widely used in chemical analysis and in studies of the properties of atoms, molecules, ions, etc.

store—to place, hold, and/or retain data, typically in a memory.

sub-plurality—a subset and/or portion of a larger identified plurality.

substantially—to a great extent and/or degree.

supercontinuum—an optical spectral continuum formed when a collection of nonlinear processes act together upon an input laser light (a "pump beam") in order to cause severe spectral broadening of the pump beam, for example using a microstructured optical fiber, wherein the bandwidth of the pump beam is broadened by at least 60 nm.

support—to bear the weight of, especially from below.

surrounding—to encircle, enclose or confine on all sides, and/or extend on all sides of simultaneously.

symmetrical—possessing or displaying symmetry.

symmetry—the correspondence of the form and arrangement of elements and/or parts on opposite sides of a dividing line and/or plane and/or about a center and/or an axis.

system—a collection of mechanisms, devices, machines, articles of manufacture, processes, data, and/or instructions, the collection designed to perform one or more specific functions.

take—to choose, select, adopt, make, assume, derive, obtain, receive, extract, assume, consider, understand, and/or use.

tellurite—a material that contains tellurium oxide ($TeO_2$) as the main component, i.e., >50 mole %.

temperature—a measure of the average kinetic energy of the molecules in a sample of matter, expressed in terms of units or degrees designated on a standard scale.

that—used as the subject or object of a relative clause.

third—a label for an element in one or more patent claims, the element other than a "first" or "second" referenced element of a similar type, but the label does not necessarily imply any type of ordering to how that "third" element or the "second" element or the "first" element is implemented in embodiments of the claimed subject matter, and unless stated otherwise, does not necessarily limit the number of referenced elements to three.

three—a cardinal number equal to one plus one plus one.

through—across, among, between, and/or in one side and out the opposite and/or another side of.

to—a preposition adapted for use for expressing purpose.

transform—to change in measurable: form, appearance, nature, and/or character.

transmission—the electrical and/optical and/or electromagnetic transfer of light, quantum of energy, signal, message, and/or signal from one location to another.

transmit—to provide, furnish, supply, send as a signal, and/or to convey (e.g., force, energy, and/or information) from one place and/or thing to another.

transparent—clear; characterized by conveying incident light without reflecting or absorbing a substantial portion of that light; and/or having the property of transmitting rays of light through its substance so that bodies situated beyond or behind can be distinctly seen.

travel—to go and/or appear to go from one place to another; and/or to pass and/or be transmitted.

treatment—an act, manner, or method of handling and/or dealing with someone and/or something.

triangular—pertaining to or having the form of a triangle; three-cornered.

tube—an elongated member, such as a pipe, hollow cylinder, or hollow rod-like member having a longitudinal axis and defining a longitudinal cross-section resembling any closed shape such as, for example, a circle, a non-circle such as an oval (which generally can include a shape that is substantially in the form of an obround, ellipse, limagon, cardioid, Cartesian oval, and/or Cassini oval, etc.), and/or a polygon such as a triangle, rectangle, square, hexagon, the shape of the letter "D", the shape of the letter "P", etc. Thus, a right circular cylinder is one form of a tube, an elliptic cylinder is another form of a tube having an elliptical longitudinal cross-section, and a generalized cylinder is yet another form of a tube. A tube can define a wall that is shaped in the form of a simple closed curve and that extends axially, providing a conduit throughout its length.

two—a cardinal number equal to one plus one.

two times—approximately twice in magnitude.

upon—immediately or very soon after; and/or on the occasion of.

use—to put into service.

variety—the quality or condition of being various and/or varied; diversity via—by way of and/or utilizing.

Watt—a derived SI unit of power, equal to 1 joule per second; symbol W.

wavelength—the distance between one peak or crest of a wave.

weight—a force with which a body is attracted to Earth or another celestial body, equal to the product of the object's mass and the acceleration of gravity; and/or a factor and/or value assigned to a number in a computation, such as in determining an average, to make the number's effect on the computation reflect its importance, significance, preference, impact, etc.

when—at a time and/or during the time at which.

wherein—in regard to which; and; and/or in addition to.

with—accompanied by.

with regard to—about, regarding, relative to, and/or in relation to.

with respect to—about, regarding, relative to, and/or in relation to.

within—inside the limits of.

zone—a region and/or volume having at least one predetermined boundary.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. References herein to "in one embodiment", "in an embodiment", or the like do not necessarily refer to the same embodiment.

Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects any person having ordinary skill in the art, after obtaining authorization from the inventor(s), to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly unsuitable, inoperable, or contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential"; and within, among, and between any described embodiments: any two or more described substances can be mixed, combined, reacted, separated, and/or segregated;

any described characteristic, function, activity, substance, component, and/or structural element, or any combination thereof, can be specifically included, duplicated, excluded, combined, reordered, reconfigured, integrated, and/or segregated;

any described interrelationship, sequence, and/or dependence between any described characteristics, functions, activities, substances, components, and/or structural elements can be omitted, changed, varied, and/or reordered;

any described activity can be performed manually, semi-automatically, and/or automatically;

any described activity can be repeated, performed by multiple entities, and/or performed in multiple jurisdictions.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all sub-ranges therebetween, such as for example, 1 to 3.65, 2.8 to 8.14, 1.93 to 9, etc., even if those specific values or specific sub-ranges are not explicitly stated.

When any phrase (i.e., one or more words) appearing in a claim is followed by a drawing element number, that drawing element number is exemplary and non-limiting on claim scope.

No claim or claim element of this document is intended to invoke 35 USC 112(f) unless the precise phrase "means for" is followed by a gerund.

Any information in any material (e.g., a United States patent, United States patent application, book, article, web page, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document when reasonably interpreted by a person having ordinary skill in the relevant art.

What is claimed is:

1. A substantially monolithic, elongated, photonic crystal fiber comprising:
   an elongated solid core that extends a length of the photonic crystal fiber and that defines a fiber longitudinal axis; and
   an elongated annular cladding extending the length of the photonic crystal fiber and is co-axial with the core;
   wherein the photonic crystal fiber defines:
      a circular fiber cross-section defined on a cross-sectional plane that extends perpendicularly to the fiber longitudinal axis;
      a plurality of longitudinally extending air holes;
      a first sub-plurality of longitudinally extending air holes from the plurality of longitudinally extending air holes have a first cross-sectional hole shape and are arranged on the circular fiber cross-section to define a first circular ring of a concentric plurality of circular rings on the circular fiber cross-section, each air hole from the first sub-plurality of longitudinally extending air holes having a characteristic cross-sectional dimension that is substantially equal to the characteristic cross-sectional dimension of each other air hole from the first sub-plurality of longitudinally extending air holes;
      a second sub-plurality of longitudinally extending air holes from the plurality of longitudinally extending air holes have a second cross-sectional hole shape and are arranged on the circular fiber cross-section to define a second circular ring of the concentric plurality of circular rings, the second circular ring located adjacent the first circular ring, the second circular ring having a diameter larger than a diameter of the first circular ring, each air hole from the second sub-plurality of longitudinally extending air holes having a characteristic cross-sectional dimension that is substantially equal to the characteristic cross-sectional dimension of each other air hole from the second sub-plurality of longitudinally extending air holes; and
      a third sub-plurality of longitudinally extending air holes from the plurality of longitudinally extending air holes have a third cross-sectional hole shape and are arranged on the circular fiber cross-section to define a third circular ring of the concentric plurality of circular rings, the third circular ring located adjacent the second circular ring, the third circular ring having a diameter larger than the diameter of the second circular ring, each air hole from the third sub-plurality of longitudinally extending air holes having a characteristic cross-sectional dimension that is substantially equal to the characteristic cross-sectional dimension of each other air hole from the third sub-plurality of longitudinally extending air holes;
   and wherein:
      the number of longitudinally extending air holes of each circular ring of the concentric plurality of circular rings is equal; and
      the characteristic cross-sectional dimension of each longitudinally extending air hole in at least one circular array of longitudinally extending air holes from the plurality of longitudinally extending air holes is substantially different from the characteristic cross-sectional dimension of each longitudinally extending air hole in another circular array of longitudinally extending air holes from the plurality of longitudinally extending air holes.

2. The photonic crystal fiber of claim 1, wherein:
   a radial position of the second sub-plurality of longitudinally extending air holes from the plurality of longitudinally extending air holes is rotated by 360 degrees/(two times the number of longitudinally extending air holes in the second sub-plurality of longitudinally extending air holes from the plurality of longitudinally extending air holes) about the fiber longitudinal axis with respect to a radial position of the first sub-plurality of longitudinally extending air holes from the plurality of longitudinally extending air holes; and
   a radial position of the third sub-plurality of longitudinally extending air holes from the plurality of longitudinally extending air holes is rotated by 360 degrees/(two times the number of longitudinally extending air holes in the third sub-plurality of longitudinally extending air holes from the plurality of longitudinally extending air holes) about the fiber longitudinal axis with respect to a radial position of the second sub-plurality of longitudinally extending air holes from the plurality of longitudinally extending air holes.

3. The photonic crystal fiber of claim 1, wherein:
   a radial position of the second sub-plurality of longitudinally extending air holes from the plurality of longitudinally extending air holes is rotated a different amount about the fiber longitudinal axis (with respect to a radial position of the first sub-plurality of longitudinally extending air holes from the plurality of longitudinally extending air holes) than a radial position of the third sub-plurality of longitudinally extending air holes from the plurality of longitudinally extending air holes.

4. The photonic crystal fiber of claim 1, wherein:
   a set of longitudinally extending air holes from the plurality of longitudinally extending air holes define a ring and are equally radially distributed along that ring and about the fiber longitudinal axis.

5. The photonic crystal fiber of claim 1, wherein:
   a set of longitudinally extending air holes from the plurality of longitudinally extending air holes define a ring and are not equally radially distributed along that ring and about the fiber longitudinal axis.

6. The photonic crystal fiber of claim 1, wherein:
   the characteristic cross-sectional dimension of each longitudinally extending air hole in a first pre-selected sub-plurality of longitudinally extending air holes from the plurality of longitudinally extending air holes is equal to the characteristic cross-sectional dimension of each longitudinally extending air hole in a second pre-selected sub-plurality of longitudinally extending air holes from the plurality of longitudinally extending air holes, the first pre-selected sub-plurality of longitudinally extending air holes from the plurality of longitudinally extending air holes defining a first predetermined ring from the concentric plurality of circular rings, the second pre-selected sub-plurality of longitudinally extending air holes from the plurality of longitudinally extending air holes defining a second predetermined ring from the concentric plurality of circular rings.

7. The photonic crystal fiber of claim 1, wherein:
the number of longitudinally extending air holes in a first pre-selected sub-plurality of longitudinally extending air holes from the plurality of longitudinally extending air holes is different from the number of longitudinally extending air holes in a second pre-selected sub-plurality of longitudinally extending air holes from the plurality of longitudinally extending air holes, the first pre-selected sub-plurality of longitudinally extending air holes from the plurality of longitudinally extending air holes defining a first predetermined ring from the concentric plurality of circular rings, the second pre-selected sub-plurality of longitudinally extending air holes from the plurality of longitudinally extending air holes defining a second predetermined ring from the concentric plurality of circular rings.

8. The photonic crystal fiber of claim 1, wherein:
a spacing between the second circular ring and the first circular ring is substantially equal to a spacing between the second circular ring and the third circular ring.

9. The photonic crystal fiber of claim 1, wherein:
a spacing between the second circular ring and the first circular ring is different from a spacing between the second circular ring and the third circular ring.

10. The photonic crystal fiber of claim 1, wherein:
the photonic crystal fiber is configured to operatively transmit light in a single mode.

11. The photonic crystal fiber of claim 1, wherein:
the photonic crystal fiber is configured to operatively transmit light in a single mode, a large mode area of the photonic crystal fiber is greater than 175 square microns, and the photonic crystal fiber is configured to operatively transmit a laser power greater than 1 Watt.

12. The photonic crystal fiber of claim 1, wherein:
a transmission loss for light traveling the length of the photonic crystal fiber and having a wavelength of from about 2 microns to about 15 microns is less than 1000 decibels per kilometer.

13. The photonic crystal fiber of claim 1, wherein:
the photonic crystal fiber comprises a transparent glass material that comprises chalcogenide, fluoride, or tellurite.

14. The photonic crystal fiber of claim 1, wherein:
each of a predetermined sub-plurality of longitudinally extending air holes from the plurality of longitudinally extending air holes has a cross-sectional hole shape selected from circular, elliptical, rectangular, and triangular.

15. The photonic crystal fiber of claim 1, wherein:
each longitudinally extending air hole from the plurality of longitudinally extending air holes has the same shape.

16. The photonic crystal fiber of claim 1, wherein:
a predetermined sub-plurality of longitudinally extending air holes from the plurality of longitudinally extending air holes has the same shape.

17. The photonic crystal fiber of claim 1, wherein:
all longitudinally extending air holes of a first predetermined ring have a different shape than all longitudinally extending air holes of a second predetermined ring.

18. The photonic crystal fiber of claim 1, wherein:
all longitudinally extending air holes of a predetermined ring have a common shape.

19. The photonic crystal fiber of claim 1, wherein:
a predetermined subset of longitudinally extending air holes from a predetermined ring have a different shape than the remainder of holes of the predetermined ring.

20. The photonic crystal fiber of claim 1, wherein:
a first cross-sectional diameter of the photonic crystal fiber at a first location along the length of the photonic crystal fiber is different from a second cross-sectional diameter of the photonic crystal fiber at a second location along the length of the photonic crystal fiber.

21. The photonic crystal fiber of claim 1, wherein:
the cross-sectional diameter of the photonic crystal fiber changes linearly from a first location along the length of the photonic crystal fiber to a second location along the length of the photonic crystal fiber.

22. The photonic crystal fiber of claim 1, wherein:
the cross-sectional diameter of the photonic crystal fiber changes linearly and adiabatically from a first location along the length of the photonic crystal fiber to a second location along the length of the photonic crystal fiber.

23. The photonic crystal fiber of claim 1, wherein:
the number of circular rings in the concentric plurality of circular rings is greater than three.

24. An optical device comprising the photonic crystal fiber of claim 1, and at least one of:
a LIDAR/LADAR (Light/Laser Detection and Ranging) system;
an advanced driver assistance systems (ADAS) system;
a medical laser device;
a chemical sensor;
a spectroscopy instrument;
a supercontinuum source;
a broadband laser beam delivery device; and
a mid-infrared transmission system.

25. A substantially monolithic, elongated, photonic crystal fiber comprising:
an elongated solid core that extends a length of the photonic crystal fiber and that defines a fiber longitudinal axis; and
an elongated annular cladding extending the length of the photonic crystal fiber and is co-axial with the core;
wherein the photonic crystal fiber defines:
a circular fiber cross-section defined on a cross-sectional plane that extends perpendicularly to the fiber longitudinal axis;
a plurality of longitudinally extending air holes;
a first sub-plurality of longitudinally extending air holes from the plurality of longitudinally extending air holes have a first cross-sectional hole shape and are arranged on the circular fiber cross-section to define a first circular ring of a concentric plurality of circular rings on the circular fiber cross-section, each air hole from the first sub-plurality of longitudinally extending air holes having a characteristic cross-sectional dimension that is substantially equal to the characteristic cross-sectional dimension of each other air hole from the first sub-plurality of longitudinally extending air holes;
a second sub-plurality of longitudinally extending air holes from the plurality of longitudinally extending air holes have a second cross-sectional hole shape and are arranged on the circular fiber cross-section to define a second circular ring of the concentric plurality of circular rings, the second circular ring located adjacent the first circular ring, the second circular ring having a diameter larger than a diameter of the first circular ring, each air hole from the second sub-plurality of longitudinally extending air holes having a characteristic cross-sectional dimension that is substantially equal to the characteristic cross-sectional dimension of each other air hole from the second sub-plurality of longitudinally extending air holes; and a third sub-plurality of longitudinally extending air holes from the plurality of longitudinally extending air holes have a third cross-sectional hole shape and are arranged on the circular fiber cross-section to define a third circular ring of the concentric plurality of circular rings, the third circular ring located adjacent the second circular ring, the third circular ring having a diameter larger than the diameter of the second circular ring, each air hole from the third sub-plurality of longitudinally extending air holes having a characteristic cross-sectional dimension that is substantially equal to the characteristic cross-sectional dimension of each other air hole from the third sub-plurality of longitudinally extending air holes;

and wherein:

the number of longitudinally extending air holes of each circular ring of the concentric plurality of circular rings is equal; and the characteristic cross-sectional dimension of each longitudinally extending air hole from the plurality of longitudinally extending air holes is substantially equal.

* * * * *